United States Patent

Tuan et al.

[11] Patent Number: 5,482,907
[45] Date of Patent: Jan. 9, 1996

[54] CERAMIC COMPOSITE CONTAINING A SPINEL PHASE AND AN OXIDE PHASE AND THE PREPARATION THEREOF

[75] Inventors: Wei-Hsing Tuan; Ming-Cherng Lin, both of Taipei, Taiwan

[73] Assignee: National Science Council, Taipei, Taiwan

[21] Appl. No.: 249,860

[22] Filed: May 26, 1994

[51] Int. Cl.$^6$ .................. C04B 35/443; C04B 35/117; C04B 35/12; C04B 35/26

[52] U.S. Cl. ............ 501/120; 501/126; 501/127; 501/132; 501/153

[58] Field of Search .................. 501/120, 126, 501/132, 153, 127

[56] References Cited

U.S. PATENT DOCUMENTS

| | | | |
|---|---|---|---|
| 2,492,543 | 12/1949 | Verwey | 501/120 |
| 4,348,485 | 9/1982 | Oohasi et al. | 501/120 |
| 4,400,431 | 8/1983 | Henslee et al. | 501/120 |

*Primary Examiner*—C. Melissa Bonner
*Attorney, Agent, or Firm*—Hitt Chwang & Gaines

[57] ABSTRACT

A ceramic composite contains one spinel phase and one or more than one oxides phases. The composite is derived from the mixtures of two oxides, $A_2O_3$ and BO, with different molar ratio, in which A and B are metallic ions of three and two valences respectively. The oxides are heated at a high temperature to form a composite containing a spinel and residual oxides. The formed spinel and residual oxides also undergo densification under high temperature. After the treatment at high temperature, not only the spinel is formed but also the composite is densified. The performance of the composite is superior in its strength, toughness and high-temperature stability.

3 Claims, No Drawings

CERAMIC COMPOSITE CONTAINING A SPINEL PHASE AND AN OXIDE PHASE AND THE PREPARATION THEREOF

FIELD OF THE INVENTION

The present invention relates to a ceramic composite, particularly a ceramic composite containing a spinel phase and one or more oxide phases.

BACKGROUND OF THE INVENTION

Ceramics have great potential in industrial applications because they are superior in their hardness, chemical stability and refractory characteristics. Currently, most ceramics used in the industry are single phase ceramics. However, when using these single phase ceramics, they have the following drawbacks:

1. It is difficult to produce dense single phase ceramics with a small grain size. The strength of ceramics is proportional inversely to the square root of the grain size. That is, the strength becomes greater as the grain becomes smaller. The strength of ceramics, on the other hand, will decrease drastically as the amount of porosity increases. Therefore, the ceramics must be completely densified. During the densification process, however, the grainls often grow rapidly and the strength is affected as a result.
2. The high temperature stability is not satisfactory. When the single phase ceramics are used at high temperatures, their grains will grow rapidly. Therefore, the strength of ceramics will be decreased the longer they are in use.
3. Other than some partially stabilized zirconium oxides, the toughness of single phase ceramics usually is not high. Low toughness causes the ceramics to become brittle. This situation results in increased difficulties when using these single phase ceramics.

In order to overcome the above drawbacks, multi-phase ceramics, i.e. ceramic composites, have been developed. A ceramic composite consists of adding a ceramic additive into another ceramic base. The blended additive, correctly composed, can hinder the growth of grains and create a final product with a smaller grain size and better high temperature stability. Furthermore, because the additive has a different Young modulus than that of the ceramic base, the cracks will propagate in a twisted way. This will increase the toughness of the product. Currently, on the market, the ceramic composites include alumina/SiC whiskers and alumina/zirconia composites. The two phases in these systems do not react at high temperature or have only a limited reaction. These composites often have superior properties than the single phase ceramics. The drawback, however, is that they are more expensive.

Because of the single phase ceramics' drawbacks and the expense for the composites, the inventor, after long research, has invented an improved ceramic composite.

The main purpose of the invention is to provide a ceramic composite with excellent properties to be used in industry and to provide a preparation method to produce the ceramic composite. The advantages of this method include the use of cheap raw materials and simple, easily controlled production steps.

SUMMARY OF THE INVENTION

In order to achieve the above objectives, the ceramic composite according to the invention comprises:

1–99 weight % of a spinel phase; and
99–1 weight % of an oxide phase, in which the oxide phase comprises an $A_2O_3$ oxide, a BO oxide, or both, and the spinel phase comprises a $BA_2O_4$ spinel; and wherein A is a three-valence metal ion and B is a two-valence metal ion.

Selectively, the oxide phase of the ceramic composite of the present invention further contains a $M_2O_3$ oxide; and the spinel phase further contains a $BM_2O_4$ spinel and $B(A_yM_{2-y})O_4$ spinel, in which M is a three-valence metal ion and different from A and $0<y<2$.

Selectively, the oxide phase of the ceramic composite of the present invention further contains a DO oxide and the spinel phase further contains a $DA_2O_4$ spinel and $(B_xD_{1-x})A_2O_4$ spinel, in which D is a two-valence metal ion and different from B and $0<x<1$.

The metal ion A of the ceramic composite of the present invention is selected from the three-valence metal ion group consisting of aluminum, chromium, and iron.

The metal ion M of the ceramic composite of the present invention is selected from the three-valence metal ion group consisting of aluminum, chromium, and iron.

The metal ion B of the ceramic composite of the present invention is selected from the two-valence metal ion group consisting of nickel, zinc, magnesium, iron, cobalt, manganese, and copper.

The metal ion D of the ceramic composite of the invention is selected from the two-valence metal ion group consisting of nickel, zinc, magnesium, iron, cobalt, manganese, and copper.

The $BA_2O_4$ of the ceramic composite of the invention, for example, is a nickel aluminate spinel, zinc aluminate spinel, magnesium aluminate spinel, cobalt aluminate spinel, zinc chromate spinel, magnesium chromate spinel, iron chromate spinel, zinc ferrite spinel, manganese ferrite spinel or copper ferrite spinel.

A suitable method of preparing the ceramic composite of the present invention comprises the following steps:

(a) mixing one or more oxide powders from each type of $A_2O_3$ and BO oxide powder to give a mixed powder;

(b) slip casting, die pressing, or cold-isostatic pressing the mixed powder to form a green body; and (c) calcining the green body at a temperature from 1000° C. to 2000° C. to form a ceramic composite containing a $BA_2O_4$ spinel phase and an oxide phase;

in which A and B are defined as above.

In step (a) of the above preparation method, the molar mixing ratio of $A_2O_3$ and BO oxide powders is not equal to 1.0.

DETAILED DESCRIPTION OF THE INVENTION

This invention uses two or more oxides from two different types of oxides $A_2O_3$ and BO as the starting materials (A and B are defined as above) and these oxides will react at high temperature to produce a ceramic composite with excellent properties. The high temperature reaction of this invention is the spinel reaction. For example, $$A_2O_3 + BO \rightarrow BA_2O_4,$$

in which $A_2O_3$ and BO are oxides and $BA_2O_4$ is a spinel. The reaction of synthetic spinel can occur among oxides in the table below.

TABLE 1

| A$_2$O$_3$ | + | BO | → | BA$_2$O$_4$ |
|---|---|---|---|---|
| Al$_2$O$_3$ | | NiO | | NiAl$_2$O$_4$ |
| Al$_2$O$_3$ | | ZnO | | ZnAl$_2$O$_4$ |
| Al$_2$O$_3$ | | MgO | | MgAl$_2$O$_4$ |
| Al$_2$O$_3$ | | FeO | | FeAl$_2$O$_4$ |
| Al$_2$O$_3$ | | CoO | | CoAl$_2$O$_4$ |
| Cr$_2$O$_3$ | | ZnO | | ZnCr$_2$O$_4$ |
| Cr$_2$O$_3$ | | MgO | | MgCr$_2$O$_4$ |
| Cr$_2$O$_3$ | | FeO | | FeCr$_2$O$_4$ |
| Fe$_2$O$_3$ | | ZnO | | ZnFe$_2$O$_4$ |
| Fe$_2$O$_3$ | | MnO | | MnFe$_2$O$_4$ |
| Fe$_2$O$_3$ | | CuO | | CuFe$_2$O$_4$ |

Listings on Table 1 are only examples. When the molar ratio of A$_2$O$_3$ and BO is not 1:1, besides the formation of spinel, residual oxides with a higher mole number will be present. Three types of oxides can be used to form spinel. For example, magnesium oxide, aluminum oxide, and chromium(III) oxide can form Mg(Al$_y$Cr$_{2-y}$)O$_4$ spinel, in which 0<y<1.

The spinel-containing ceramic composite prepared by this invention can have a spinel content of 1% to 99% (weight) and the residual oxides are 1% to 99% (weight).

A method suitable to prepare the spinel-containing ceramic composite of this invention is, for example, selecting one or more oxides of the A$_2$O$_3$ and BO oxides, in which the A$_2$O$_3$ oxide can be a three-valence oxide such as aluminum oxide, chromium(III) oxide, iron(III) oxide, etc.; the BO oxide can be a mono-oxide such as nickel oxide, zinc oxide, magnesium oxide, iron(II) oxide, cobalt(II) oxide, copper(II) oxide, etc. These oxides have a different mole number. The powders are ground with a ball mill and mixed. The material can be formed into a particular shape in a plaster mold by slip casting. Or after drying, the powder mixture can be poured into a steel mold to be pressed into a particular shape. Or the powder mixture is poured into a plastic mold and pressed into a particular shape by cold-isostatic pressing. The formed green body is then put into a high temperature furnace and heated. The spinel reaction occurs at this stage. Furthermore, because the oxides have different mole numbers, there will be one or more oxides that have not reacted completely and which remain in the composite. These residual phases and the newly formed spinel are maintained at the high temperature for a period of time. This increases the density. In the end, a dense spinel-containing ceramic composite is obtained.

EXAMPLES 1~5

A nickel oxide powder (NiO, Johnson Matthey Co., USA) with an average diameter of 16 μm and an aluminum oxide powder (TM-DR, Ta mei Chem. Co. Ltd., Tokyo, Japan) with an average diameter of 0.2 μm, under the premise that the two were at different mole numbers and a different ratio, were added into a ball mill. Partially stabilized zirconium oxide balls and alcohol were also added into the ball mill. The powder mixture was ground for 4 hours. After being dried, the powder was poured into a steel mold and a uniaxial pressure of 20 MPa was applied to form a rectangular specimen. The specimen was put in a plastic mold and pressurized to 250 MPa by cold-isostatic pressing to strengthen the green compact. The Green compact was put into a sintering furnace and sintered at 1700° C. for one hour. A dense specimen was prepared. The specimen density was measured by the Archimedes' method. The specimen was polished and ground with a diamond paste. The specimen was thermally etched by heat treatment at 1450° C. for half an hour so as to reveal the grain boundaries. The grain size was measured by using the linear intercept technique. The results are shown in Table 2.

TABLE 2

| | Weight Percent of Starting Materials | | In the Ceramic Composite | | Density of the Ceramic Composite | Grain Size in Each Phase of the Ceramic Composite, μm | |
|---|---|---|---|---|---|---|---|
| Example | Aluminum Oxide % | Nickel Oxide % | Aluminum Oxide % | Nickel Aluminate Spinel % | | Aluminum Oxide | Nickel Aluminate Spinel |
| 1 | 100 | 0 | 100 | 0 | 98.7 | 15.1 | — |
| 2 | 95.6 | 4.4 | 90.8 | 9.2 | 98.8 | 10.7 | 7.1 |
| 3 | 87.1 | 12.9 | 72 | 28 | 98.2 | 10.0 | 9.4 |
| 4 | 79.7 | 20.3 | 56 | 44 | 96.6 | 12.5 | 9.4 |
| 5 | 56.6 | 43.4 | 0 | 100 | 97.8 | — | 16.8 |

Comparing the ceramic composite in Table 2 with the single phase aluminum oxide (Example 1) and the single phase nickel aluminate spinel (Example 5), the rate of grain growth in the ceramic composite is slower. Therefore, the ceramic composite has better high temperature stability than the single phase material.

EXAMPLES 6~8

The specimens used in Examples 6 to 8 were prepared by the same procedures as the specimens used in Examples 1 to 5. Strength values of Example 6 to 8 specimens are listed on Table 3. These values are measured by the four-point bending method (JIS R1601).

TABLE 3

| | Weight Percent of Starting Materials, % | | Strength at Room Temperature, |
|---|---|---|---|
| Example | Aluminum Oxide | Nickel Oxide | MPa |
| 6 | 100 | 0 | 286 |
| 7 | 95.6 | 4.4 | 309 |
| 8 | 79.7 | 20.3 | 309 |

Table 3 shows that strength of the ceramic composites of Examples 7 and 8 is greater than that of the single phase ceramic.

EXAMPLES 9–10

76 mole % of aluminum oxide powder (AES11, Sumitomo Co., Japan) and 24 mole % of zinc oxide powder (ZnO, CML Co., Australia) were added into a ball mill. Partially stabilized zirconium oxide balls and alcohol were also added into the ball mill. The powder mixtures were ground for 2 hours. After being dried, the powder mixtures were die pressed at 90 MPa followed by sintering to obtain a dense specimen. The sintering temperature was 1650° C. and was maintained at the temperature for 5 hours. The specimen density was measured by the Archimedes' method and its strength was measured by the four-point bending method according to JIS R1601.

posite in a high temperature environment is slower than that of the single phase ceramic, the composite has better high temperature stability. Therefore, the composite has great potential in high temperature applications. The spinel-containing ceramic composite can be made by using cheap oxides as the starting material. The oxides are mixed at different mole ratios and processed at high temperature to obtain the composite. Therefore, the ceramic composite of this invention has high commercial value and meets the elements of an invention application. Any variation or modification according to the characteristics and spirit of the claims of this invention belongs to the scope of this invention.

TABLE 4

| | Before Sintering | | After Sintering(1650° C./5 hours) | | | |
|---|---|---|---|---|---|---|
| Example | Aluminum Oxide Mole % | Zinc Oxide Mole % | Aluminum Oxide Mole % | Zinc Aluminate Spinel, Mole % | Density of the Composite, % | Strength, MPa |
| 9 | 100 | 0 | 100 | 0 | 98.6 | 241 |
| 10 | 76 | 24 | 68 | 32 | 98.9 | 377 |

Example 10 on Table 4 shows that the spinel ceramic composite has better strength than that of the single phase ceramic of Example 9.

EXAMPLE 11–13

The specimens used in Examples 11 to 13 were prepared by the same procedures as the specimens used in Examples 1 to 5. After specimens of Example 11 to Example 13 were polished, a Vickers' diamond indenter was nailed onto the polished surface of the specimens. The formula derived by B. R. Lawn et. al. (B. R. Lawn, A. G. Evans, D. B. Marshall, J. Amer. Ceram. Soc., 63, 574, 1980) was used to calculate the fracture toughness values ($K_{IC}$) of the specimens. The Young Modulus required by the calculation was obtained by the Ultrasonic Resonance Method.

What is claimed is:

1. A ceramic composite, which comprises:

1–99 weight % of a spinel phase; and

99–1 weight % of an oxide phase, wherein the oxide phase consists essentially of an $A_2O_3$ oxide and a DO oxide; and the spinel phase comprises a $BA_2O_4$ spinel, a $DA_2O_4$ spinel, and a $(B_xD_{1-x})A_2O_4$ spinel; wherein A is a three-valence metal ion, wherein B is different from D and both B and D are two-valence metal ions; and wherein $0<x<1$.

2. The composite of claim 1 wherein the metal D is selected from the group consisting of nickel, zinc, magnesium, iron, cobalt, manganese, and copper.

TABLE 5

| | Volume % In Each Phase of the Ceramic Composite | | Young Modulus, | $K_{IC}$ Value, |
|---|---|---|---|---|
| Example | Aluminum Oxide | Nickel Aluminate Spinel | GPa | MPa$\sqrt{m}$ |
| 11 | 100 | 0 | 392 | 3.0 |
| 12 | 72 | 28 | 323 | 3.6 |
| 13 | 56 | 44 | 295 | 3.7 |

From Table 5, it can be seen that the spinel ceramic composite of Examples 12 and 13 have higher toughness than that of the single phase ceramic of Example 10.

To sum up, the spinel-containing ceramic composite of this invention has the advantages of high strength and toughness. Also because the grain growth rate of the com- 3. The composite of claim 1, wherein the metal A is selected from the group consisting of aluminum, chromium, and iron; and the metal B is selected from the group consisting of nickel, zinc, magnesium, iron, cobalt, manganese, and copper.

* * * * *